Jan. 7, 1969  A. H. ROBERTS  3,420,729
MOLDED HOLLOW PLASTIC ARTICLES OF MANUFACTURE RIGIDIFIED WITH
RIGID RESINOUS COMPOSITIONS AND PROCESS
FOR THEIR MANUFACTURE
Filed Feb. 7, 1966

INVENTOR
ARTHUR H. ROBERTS
BY
LASZLO AUER
AGENT.

United States Patent Office 3,420,729
Patented Jan. 7, 1969

3,420,729
MOLDED HOLLOW PLASTIC ARTICLES OF MANU-
FACTURE RIGIDIFIED WITH RIGID RESINOUS
COMPOSITIONS AND PROCESS FOR THEIR
MANUFACTURE
Arthur H. Roberts, 1208 Eastern Parkway,
Brooklyn, N.Y. 11213
Continuation-in-part of applications Ser. No. 22,002,
Apr. 13, 1960, Ser. No. 455,764, May 14, 1965,
Ser. No. 475,989, July 30, 1965, and Ser. No.
523,778, Jan. 28, 1966. This application Feb. 7,
1966, Ser. No. 525,667
U.S. Cl. 161—7            25 Claims
Int. Cl. B44c 3/00; B29c 5/00

ABSTRACT OF THE DISCLOSURE

Rigid decorative hollow articles are produced by preparing an outer shell component from a pliable thermoplastic material. Compositions containing vinyl chloride in a polymerized and plasticized state illustrate suitable materials for the shell component. Slush casting illustrates a suitable method for preparing the outer shell component. The outer shell is then rigidified by a solidifiable rigid resin composition, which jointly forms with the shell component a cavity. The rigidifier component is intimately bonded to the entire inner surface of the outer shell component. Rigidifier resin components comprise rigid thermosetting polyester resins or rigid thermosetting epoxy resins. The polyester resins are condensation products of dibasic acids with diols and may also contain cross-linking monomers.

---

This application is a continuation-in-part of my copending patent applications Ser. No. 22,002, now abandoned, and filed Apr. 13, 1960, for "Method and Means for Manufacturing Various Articles and Articles Produced Thereby," Ser. No. 455,764, filed May 14, 1965, for "Impact Resistant Article and Method of Manufacture," Ser. No. 475,989, filed July 30, 1965, for "Molded Hollow Articles of Manufacture and Process for their Preparation" and Ser. No. 523,778, filed Jan. 28, 1966, for "Molded Articles of Manufacture Reinforced with Rigid Cellular Plastics and Process for Their Manufacture."

This invention relates to novel, rigid, impact resistant articles and to methods and means for their manufacture. The articles are of varying sizes, may have more or less intricate shapes and may have "undercuts." Similar articles in the prior art were made predominantly of ceramic or plaster materials. These prior art articles of manufacturer have the disadvantage of being fragile and easily chipped. They require much hand finishing on the seam lines caused by the mold seams.

The prior art has also disclosed various casting processes for manufacturing seamless hollow articles out of plastisols and similar plastics materials. The resulting product is quite attractive and can be decorated as easily as plaster, and in fact more easily than ceramics. The plastisol articles so cast will not chip, however they are deformable. Also, if the die is seamless, a seamless product can be obtained. Plastisol has a defect called "creep" or "cold flow," which results in a warpage or distortion at somewhat higher than ambient temperatures as in the vicinity of household radiators and electric lamps. This property is generally characterized by the temperature at which distortion occurs.

Therefore, manufacturers of such prior art articles as lamp bases have had the choice of producing ceramic and plaster articles or the like which are resistant to heat but fragile, or producing plastisol articles which have good impact and chipping resistance at normal temperatures, but which are deformable, have "cold flow" and poor impact resistance at low temperatures. The phenomenon of "cold flow" has also been called "heat distortion."

An object of this invention is to provide manufactured articles with improved properties and without the disadvantages of the prior art articles.

A further object is to provide a process for producing small and large seamless objects of plastics with improved resistance to cold flow, chipping and breakage, and which is distinctly superior to prior art processes and the products thereby.

Other objects of this invention will become apparent from the description of this invention further below.

The articles of manufacture of my parent applications are rigid, three-dimensional and hollow. They comprise two components: (1) an outer layer component, also called the "shell" and (2) an inner layer component, also called the "flesh" or "rigidifier." In most of the cases varying parallel cross sections of a single article show varying dimensions and shapes or configurations, indicating curved sidewalls and undercuts. In other cases the cross sections may be identical, indicating box-shaped or cylindrical objects. In an alternative form of said parent applications the outer layer component and inner layer component jointly form a cavity and this cavity is then filled with a reinforcing spine, such as a rigid plastics foam material. The outer layer component is made of a flexible plastics material, illustrated by plastisol and polyethylene, whereas the inner layer component in the various parent applications is illustrated for instance by asphalt, plaster of Paris and a composition comprising a filler which is bonded by the elastomer solids of a latex. In one of the parent applications the rigidifier component is a rigid cellular plastics, as illustrated by rigid polyurethane foams.

The composite articles of manufacture of the instant invention are rigid and hollow. They comprise a hollow outer shell component and an inner rigidifier component. The outer shell component is a premolded pliable plastics which has an access opening. The outer shell component, when free of the rigidifier component, is itself at least temporarily deformable by hand pressure. This latter property indicates the pliable nature of the outer shell component. The inner rigidifier component is a rigid thermoset plastics positioned within the space enclosed by the outer shell component and forms with the latter a joint cavity. The inner rigidifier component is of a plastics composition comprising a member of the class consisting of rigid polyester resins and rigid epoxy resins. The inner rigidifier component is in intimate contact with the entire inner surface of the shell component. The plastics of the outer shell component are preferably thermoplastic.

The composite articles of manufacturer of the instant invention are rigid. In this context the term "rigid" means a radical increase in rigidity when compared with the outer shell component itself and it also indicates utility for purposes requiring at least a certain degree of rigidity.

The varying parallel cross-sections of a single composite article of manufacture of this invention may show varying shapes and dimensions, indicating curved sidewalls, angulated sidewalls and undercuts, or may show identical shapes and dimensions, indicating box-shaped or cylindrical objects.

The shell is preset in its shape by a molding or forming operation. It is formed from a plastics material, which is preferably pliable and resilient. Depending on the plastics material selected to form the shell, the molding operations may vary, in order to utilize the most advantageous method for the selected plastics. The outer surface of the shell readily receives coloring materials for decorating the composite article. In some cases, such as when the shell is of polyethylene, the outer surface may be pretreated prior to decoration. The inner walls of the shell define an internal cavity accessible through an opening in the shell. The inner rigidifier component is in intimate contact with the inner walls of the preset shell and is in supporting relationship to the outer shell. This inner component acts as a rigidifier and rigidly maintains the outer shell in its preset shape. The inner rigidifier is formed by rigid polyester resins or rigid epoxy resins and is described in detail further below. The rigid plastics composition forming the inner rigidifier component is preferably applied in a liquid state and it solidifies within the premolded shell. In a preferred embodiment the shell component acts as a mold in which to form the inner rigidifier component. Depending on the properties of the shell and the rigid plastics composition forming the inner rigidifier, the setting of the latter may be performed while the shell is in a second mold or die. This second mold or die would usually be a split mold and is used to prevent deformation of the shell during the application and setting of the rigidifier component. The latter acts as a structural rigid backing member. The use of a second mold is superfluous in many cases.

The outer shell component of the composite article of manufacture of this invention has a preferred wall thickness of about $\frac{1}{64}$ of an inch to about $\frac{1}{4}$ of an inch. Expressed in thousandths of an inch, this corresponds to a range of from about 15.625 mils to about 250 mils. The lower figure may be rounded out to about 15½ mils. The inner rigidifier flesh component may have a wall thickness ranging from about 15½ mils to about 250 mils. In some cases the wall thickness of the rigidifier may be as low as one half of the wall thickness of the outer shell component. By varying the formulation of the plastics composition forming the inner rigidifier, a tougher or more rigid inner rigidifier would permit the use of a thinner layer of rigidifier than a less tough or less rigid inner rigidifier, while maintaining the composition of the shell constant.

In one of the embodiments of this invention there is an adhesive layer between the shell component and the inner rigidifier component. The adhesive is advantageously applied to the interior surface of the shell component prior to the application of the inner rigidifier component. The adhesive improves the adhesion between the interior surface of the outer shell component and the adjacent surface of the inner rigidifier. Suitable adhesives will be illustrated further below.

In another embodiment of the instant invention an ancillary reinforcing element may be additionally present in supporting relationship to the interior surface of the cavity jointly formed by the outer shell component and the inner rigidifier component. In some of my parent applications the expression "spine" is used to describe ancillary reinforcing elements. The latter expression is preferred. This element may be applied in a continuous manner or in a discontinuous manner to the interior surface of the joint cavity. As an illustration of a preferred ancillary reinforcing element a flexible epoxy resin coating is mentioned. A flexible polyester resin is another illustration. These are advantageously applied in a liquid state to coat the entire interior surface of the joint cavity. Ancillary reinforcing elements will be discussed in greater detail further below.

As it will be seen, a large number of plastics materials are suitable to form the outer shell component. Preferred plastics comprise plasticized polyvinyl chloride, copolymers of vinyl chloride in a plasticized state and polymers of ethylene. The polymers containing vinyl chloride in a polymerized state are advantageously applied as plastisols.

The favored plastics material to form the inner rigidifier component comprises a rigid polyester resin. This may be reinforced by fibrous materials, illustrated by fiberglass either in the form of glass fibers or in the form of a matting.

The suitable process steps to form the articles of manufacture of this invention will be discussed together with the materials useful for the individual components.

When considering the improvement which the composite articles of manufacture of this invention show, versus either the properties of the shell component or of the rigidifier component, utility for many purposes becomes apparent. In case of a lamp base resistance to deformation is achieved. Such deformation may be caused by compressive forces resulting from the assembly of the lamp. The resistance to impact also increases. The thermal deformation is also decreased. The latter effect is important in manufacturing planters. These have to withstand warm climate and subtropical or tropical temperatures without deformation. In preparing wash basins the resistance to hot and cold water is improved and achieved. The modulus, the rigidity and the moment of inertia of the shell component is increased by forming the inner rigidifier component within the cavity of the shell. While the rigidifier component contributes to preventing the buckling and deformation of the outer shell component, the latter improves the impact resistance and resistance to chipping of the rigidifier component. These properties indicate utility for great many composite articles of manufacture. All the shell components used herein have an access opening. In most cases the surface area of the access opening, when compared with the total external surface area of the shell, is small. In other cases it may be larger. The access opening provides means to form the inner rigidifier component in situ within the cavity of the shell component.

THE OUTER SHELL COMPONENT

Plastisols illustrate an eminently suitable material to form the shell portion of the articles of manufacture of this invention. Plastisols are well described in the literature, as e.g. in Modern Plastics 26, 78 (Apr. 1949) by Perrone and Neuwirth. They are dispersions of finely divided polyvinyl resin powders in liquid organic plasticizers. The resins contain predominantly polyvinyl chloride with or without some other polymerized monomer. They are polymerized to a degree where they have very low solubility at room temperature. Therefore, instead of dissolving them, the plastisols contain the resins in a dispersed state; the dispersions are usually of creamy consistency at room temperature and are always fluid to a certain degree. A great variety of plasticizers can be used. Dioctyl phthalate is an example. Dioctyl adipate is another example, which frequently is used in admixture with dioctyl phthalate. Polyester plasticizers are also well known. The plastisols usually contain a stabilizer and may contain pigment, if so desired. For convenience and to achieve brevity, a few publications may be referred to, which all deal with plastisols, their formulation and application methods: (a) Geon Resin 121 in Plastisol Compounding, Service Bulletin PR–4, Revised October 1958, B. F. Goodrich Chemical Company, 24 pages. (b) The Vanderbilt News, vol. 26, No. 3, June 1960, R. T. Vanderbilt Company, Inc., page 12. (c) Modern Plastics Encyclopedia Issue for 1961, published in September 1960, Vinyl polymers and copolymers, pages 129 to 132. Plastisol Molding, pages 765 to 771. (d) Modern Plastics Encyclopedia 1965 (issued 1964), Vinyl Polymers and Copolymers, page 271; Plastisol Molding page 690.

Recently a reactive vinyl plastisol system was introduced on the market. This consists of a mixture of a vinyl dispersion resin and a reactive monomer. The former is dispersed in the latter. When heat is applied to this system, also used to cause gelatin and fusion, the reactive monomer polymerizes and produces a more rigid product than previously produced with conventional plastisols. Reactive acrylic monomers illustrate examples of such reactive monomers.

When molding plastisols, the material is heated to a gelling temperature and a gelled film or layer is formed which is very weak and cheesy, but which does not flow. Further heating is required to "fuse" the deposit, causing the resin to dissolve in the plasticizer and form a tough homogeneous resinous mass in which the powdered resin and liquid plasticizer have formed a single uniform phase. The fusion transforms the cheesy deposit or film to a tough leather-like homogeneous shell.

With regard to temperatures required, these are well known in the art. They vary from composition to composition. They vary with time. There are, further, three types of temperatures involved: (1) oven temperature, (2) mold (die) temperature, and (3) temperature of the plastisol. Gelation temperature may be accomplished by heating the oven from 150 to 600° F. and usually is between a plastisol temperature of 150 to 300° F. The necessary times vary with the temperature used. Fusion is accomplished by heating the gelled layer in ovens from about 350° F. to about 650° F. The achieved plastisol temperature for fusion should advantageously range from about 350° to 450° F. The gelation temperature and fusion temperature depend on the formulation of the plastisols. Therefore some divergence from the above temperature ranges may occur if special formulations are prepared.

The most useful molding methods for plastisol shells are illustrated by (a) slush molding, also called slush casting and (b) rotational molding, also called rotational casting. The expression "casting" is used because the plastisols are applied in fluid state and for this reason the operation has similarity to metallurgical casting. Seamless dies are preferred for the intermediate products of this invention. They can be readily utilized, even when complicated undercuts exist in the dies, as the shells produced from the plastisols are flexible, elastic and have a "shape memory," i.e., they recover from their stretched position, obtained during removal, to the original molded shape.

When slush molding or slush casting is used, in the first step an excess of plastisol may be poured into the seamless die. As the plastisol reaches gelation temperature, the layer adjacent to the metal wall of the mold gels, i.e., solidifies. The thickness of the gelled wall is determined by the duration of time the mold is exposed to the temperature of gelation. The excess pastisol is then removed by pouring off the liquid portion. Heating is then continued to complete the fusion and the molded shell is then removed or stripped from the mold. There are two methods known in slush molding: (i) One Pour Method, and (ii) Two Pour Method. Both are well known in the art and are applicable to make the shells of this invention from plastisols.

The rotational molding is another method of casting. The basic departure from the slush molding is that, instead of an excess of the liquid plastisol, a premeasured quantity of the fluid is used when charging the mold. This eliminates the need for removing any excess. As the mold containing the charged fluid plastisol is rotated on the rotational molding machine and the mold is heated, gelation of the plastisol occurs uniformly on the inner surface of the heated mold. By continuing the heating and/or increasing the temperature of the mold, the gelled plastisol fuses. The fusion completes the molding of the shell and the completed shell is then stripped and removed from the mold.

Whereas the casting by slush molding or rotational molding is preferred to form the shell from plastisols, other methods known in the art may also be followed to achieve the same purpose.

Objects made of plastisols frequently display the defect known as cold flow. Cold flow may be defined as the warpage or flow of material caused by its normal environmental temperature. Cold flow in plastics in analogous to the warping of a wax candle in a hot climate, and when a thermoplastic product is subjected to compression, tension or flexing, the cold flow characteristics become even more accentuated. When a condition of localized intensified heat, such as that to which lamp bases are often subjected, is imposed upon a stressed article, cold flow warpage becomes critical and often results in making further use of the article impossible. The application of a rigidifier in accordance with the present invention counteracts the cold flow characteristics of plastisol shells, or at least reduces them to commercial acceptable limits.

Considering the aim of this invention of producing rigid articles the flexible nature of the plastisol shells is a drawback. The application of the rigidifier component rectifies this defect.

Polyolefins, such as polyethylene and polypropylene are other illustrative examples for the production of the shell portion of this invention. Polyethylene is made today of varying properties with the low pressure and high pressure polymerization processes. It is supplied with varying densities, molecular weights, flexibility and other characteristics. The types of polyethylene most suitable for this invention are pliable, flexible and show some degree of elasticity. Polyethylene is preferred in this invention over polypropylene since it is more easily formed into pliable and flexible shells. Polyethylene copolymers, such as ethylene-vinyl acetate and ethylene-ethyl acrylate copolymers, offer improved flexibility and resilience. They are rubber-like and similar to elastomeric plastics. For the production of shells from polyethylene and polypropylene seamless dies are not satisfactory and two-piece dies are preferred, using blow molding or other methods. Polyallomers belong to this class of materials, as they are copolymers of ethylene and propylene.

The shell portion of the articles of manufacture of this invention may be formed of other materials such as vulcanized natural rubber or synthetic rubber. The shells may be formed according to known procedures of rubber technology. One of the methods useful in preparing shells from rubber is to use latex molding (latex casting) compounds, utilizing plaster of Paris molds. The Vanderbilt News, vol. 27, No. 4, December 1961, page 72, deals with latex compounding which can be used to make shells for articles according to the present invention.

Other suitable plastics materials, which can form the outer layer shells of this invention are illustrated by methyl methacrylate polymer, ethyl cellulose, polycarbonates, polyurethane elastomers, amongst others. Some illustrative examples are given below:

Example A.—Methyl methacrylate

All percentages in this example and in this specification are weight percentages. A mixture was prepared of 62.5% methyl methacrylate monomer, 0.6% benzoyl peroxide, 2.1% white color paste concentrate, compatible with methyl methacrylate, 34.3% polymethylmethacrylate, Du Pont's Lucite "30," 0.5% dimethyl-p-toluidine, totaling 100%. The shells were prepared by casting into suitable molds. The composition of this example polymerizes at room temperature. Heating to 100–120° F. accelerates polymerization considerably. Latex molds can be used. Plaster and clay molds may also be used, if coated with gelatin, cellulose acetate, sodium silicate or tin foil. Casting was carried out in a latex mold in 3 subsequent coats and yielded a molded shell with acceptable flexibility and adequate mold surface reproduction. Plasticizers may be incorporated, if desired. Harflex 340 of Harchem Division, Wallace & Tiernan, Inc. is suitable resinous-type, primary, non-migrating, saturated polyester plasticizer, compatible with methyl methacrylate monomer. The color paste was used to stain the shell. Its use is optional.

Example B.—Polycarbonate

Polycarbonates can be cast from organic solvent solutions. Polycarbonates dissolve, with ease e.g. in methylene chloride. A solution was prepared from Lexan No. 105 (General Electric Co.) powder to form a solution of 83.3% polycarbonate in 16.7% methylene chloride, yielding 100% of the solution. As an example, this solution can be slush cast in latex molds, and air can be blown in to assist in volatilizing the solvent. The latex molds are standards in casting plaster of Paris objects. the polycarbonate shell remains in the mold. It is very strong, flexible and durable, and can easily be stripped from the mold. To reduce the effect of shrinkage, fillers may be incorporated. A ratio of equal weights of filler to polycarbonate is an illustrative example. The resulting shell is still strong. Polycarbonate resins are marketed by General Electric under the trade name of Lexan. Polycarbonates can be described as polymeric combinations of bi-functional phenols or bisphenols, linked together through a carbonate linkage. They can also be blow molded and vacuum formed.

Example C.—Isocyanate elastomers (uretane elastomers)

Liquid urethane polymers, such as DuPont's Adiprene L–100, can be transformed into tough, rubbery solids by reaction of the isocyanate group with polyamine or polyol compounds. In addition, some materials which do not contain active hydrogens, such as the titanate esters, appear to catalyze cross-linking. Adiprene L–100 can be cured with diamines, or moisture (water), or polyols, or by catalysts, such as lead or cobalt naphthenate, potassium acetate and titanate esters. Tetrabutyltitanate is an example of the esters. One of the popular polyamines is MOCA, which is 4,4′-methyelene-bis-(2-chloroaniline). A formulation is illustrated by 100 parts of Adiprene L–100 and 12.5 parts of MOCA, which gives a MOCA percent-equivalent of 95. Parts are by weight. Conditions were: Mixing temperature: 212° F., cure temperature; 212° F., curing time: 3 hours. LD–420 is a different type of liquid urethane elastomer, which yields high quality vulcanizates when cured with MOCA. A respective formulation is illustrated by 100 weight parts of LD–420 (Du Pont) and 8.8 weight parts of MOCA. This is mixed and cured the same way as Adiprene L–100, for the same length of time. It is improved by aftercuring 1 week at 75° F. at 60% relative humidity. In making a shell rotational molding is recommended both for Adiprene L–100 and for LD–420. A silicone mold release is advantageously used to assist separation from the molds.

Example D.—Ethyl cellulose

Ethylcellulose shells can be molded by vacuum forming and injection molding, amongst other methods. The same applies to cellulose acetate and cellulose acetobutyrate. Combination of casting and hot melt methods may also be used.

As disclosed in some of my prior applications, flexible polyesters and flexible epoxy resins are also suitable to form the premolded outer shell component. They fall, however, in the class of thermosetting plastics and as it has been indicated further above, the thermoplastic plastics are preferred herein as the materials forming the outer shell component.

The preset molded outer shell components can be prepared by various molding processes. The selected process depends on the selected plastic material and on the shape and size of the shell to be molded. For illustrative purposes a few examples are given. Casting such as slush casting or rotational casting: Plastisol, methyl methacrylate, poly-carbonates from solution, rubber from latex, etc. Injection molding or extrusion: plastisol, polycarbonates, ethyl cellulose, polyethylene, cellulose acetate, cellulose acetobutyrate, etc. Vacuum forming: polyethylene, polycarbonates, polyallomers, etc. Blow molding: polycarbonates, polyethylene, polyallomers, ethyl cellulose, cellulose acetate, etc. Hot melt process: ethyl cellulose, plastisol or other plasticized polyvinyl chloride composition, polyethylene, etc.

Whether a one-piece, two-piece or multi-piece mold is required, depends on the selected shell material and, to some extent on the shape of the manufactured article. The molding process also influences the mold selection. Plastisol illustrates a shell forming material which permits the use of one-piece molds even if the shell has many undercuts in its shape.

Methyl methacrylate illustrates a material which requires at least two-piece molds in many instances. Blow molding and vacuum forming are usually carried out in two-piece or multi-piece molds. One-piece molds form seamless molded shapes. Two-piece molds cause, in most cases, some seam formation. It may be necessary to eliminate these seams. Therefore, seamless molding is of advantage.

The expression that the shell materials are flexible, pliable and resilient is meant in a relative manner in comparison with the inner rigidifier component of the articles of manufacture, i.e. the flesh portions which are relatively rigid. The composite article itself is rigid and resists indentation, chipping, etc. The flesh portion rigidifies the flexible shells and improves resistance to cold flow or heat distortion. The shell materials protect the rigidifier flesh portion from fracture and improve their resistance to impact. This mutual improving effect between shell and flesh materials is unexpected and surprising and the effect obtained could be described as synergistic.

From the shell materials discussed above, polyethylene and polycarbonates, when blow molded, are used at a limited thickness. In using the various shell materials with the inner rigidifier component of this invention, the composite article manufactured shows elimination of flexibility, improved resistance to impact and in many cases the tensile strength of the composite article shows improvement when compared separately with that of the shell or flesh material. These observations apply to shells made of plastisols, polyethylene, polypropylene, polyallomers, polyurethane elastomers, rubber, polycarbonate, ethyl cellulose, methyl methacrylate, amongst others. The degree of the above discussed improvements may vary according to the selection of the shell forming material, its secondary compounding ingredients, thickness and shape of the shell, formulation of the flesh material and its thickness, amongst other factors.

According to a more recent type of molding method shells can be molded by rotational casting of powders. Polyethylene in powder form illustrates suitability for this method. The powder is rotated to obtain uniform distribution over the interior surface of the mold. The mold is then heated to obtain the required molding temperature.

For the purpose of forming the outer shell component the thermoplastic plastics materials are preferred. These are illustrated by plastisols and polyethylene. The reactive vinyl plastisol systems containing reactive acrylic monomers, discussed further above, are considered as thermoplastic for the purposes of this invention and are included in the preferred group of plastics for the purpose of forming the outer shell component.

As stated above a useful range for the thickness of the inner rigidifier component is from about 15½ mils to about 250 mils. The thickness of the rigidifier may be as low as one half of the thickness of the shell. In some cases the rigidifier component may be thicker and can reach ⅜ of an inch. Therefore, a practical range of the thickness of the rigidifier component is from about 7¼ mils to about 375 mils.

POLYESTER RESINS AND EPOXY RESINS

Both polyester resins and epoxy resins may be used for various purposes in the instant invention. The types useful for the various purposes differ. For the inner rigidifier component of the composite articles of manufacture rigid polyester resins and rigid epoxy resins are used. As ancillary reinforcing elements, flexible epoxy resins and flexible polyester resins are useful. The same applies to the outer shell component as to the ancillary reinforcing elements. For this reason background information on the chemistry of polyester resins and epoxy resins is wararnted, together with characterization of the available types, such as the respective rigid resins and flexible resins.

Polyester resins are usually made in two steps. In the first step a condensation and esterification reaction occurs between a dibasic acid and a diol. In the second step the product of the condensation reaction is blended with a vinyl monomer. The dibasic acids can be unsaturated or saturated. Unsaturated dibasic acids are illustrated by maleic anhydride, fumaric acid and itaconic acid. Saturated dibasic acids are illustrated by phthalic anhydride and isophthalic acid. In most cases, mixtures of unsaturated and saturated dibasic acids are used to secure desired modifications. The diols are glycols. The useful glycols form a long list well known in the art. Propylene glycol, ethylene glycol, diethylene glycol and dipropylene glycol are illustrative examples. Neopentyl glycol is another example. Styrene is the most frequently used crosslinking vinyl monomer. Vinyl toluene is another example. The condensation products of dibasic acids and diols yield linear long chain polymers. The vinyl monomers cause the desired crosslinking.

The unsaturated dibasic acids are essential ingredients. Their condensation products with diols have limited compatibility with the monomer, too high a reactivity, and/or relatively poor general physical and strength properties. It is therefore common practice in most resin formulations to use an aromatic dibasic acid along with the unsaturated acid in order to modify these properties and improve on the general utility of the product. The aromatic dibasic acid in the polyester formulation adds compatibility, controlled reactivity, hardness, chemical resistance and strength. Isophthalic acid is finding increased usage in high impact resilient or flexible polyesters. Flexibility and/or resiliency may be enhanced by incorporation in the acid component of some adipic acid, sebacic acid, azelaic acid and dimer vegetable oil acids, amongst others. Other dibasic acid supplying components are illustrated by tetrahydrophthalic anhydride, Chlorendic or Het acid or anhydride, tetrachlorophthalic anhydride, tetrabromophthalic anhydride. The halogenated acids decrease flammability. Flexible polyesters usually contain long chain acids or glycols, or both. Propylene glycol yields rigid resins. Diethylene glycol is used widely in polyesters of the high impact, resilient and flexible types. Higher polyether glycols, like triethylene glycol and tripropylene glycol or still higher homologs, are sometimes used to increase flexibility, but at the expense of resistance to heat, water and weather. 1,6-Hexanediol and 1,3-Butylene glycol contribute to flexibility. Many other diols and their specific properties in polyester formulations are known in the art.

Monomer content ranges from 25% to 50% by weight. The remainder is the ester polymer of the dibasic acids and diols. 40% styrene content is a good illustration of a useful proportion. Specialty monomer effects can be obtained for instance with diallyl phthalate, diallyl isophthalate, triallylcyanurate and methyl methacrylate monomers. Chlorostyrene is another example.

Linear, long chain components impart flexibility. Aromatic rings or other cyclic configurations, by contrast, contribute rigidity and hardness. Increasing the flexibility of the molecule normally tends to decrease the resistance to chemicals, solvents, heat and weather. The ultimate formulation decision is generally based on proper balance of properties required and may be influenced by cost considerations also. Flexibility, for example, can be achieved in a number of ways, illustrated by increasing the proportion of flexibilizing glycol or flexibilizing dibasic acid, decreasing the proportion of maleic anhydride or fumaric acid, etc. The opposite applies to increase rigidity.

Polyester resins are supplied with some inhibitor content. Organic peroxides are useful crosslinking agents and cobalt is an illustration of a crosslinking assistant. A suitable additive to regulate viscosity is a submicroscopic pyrogenic silica prepared in a hot gaseous environment, marketed by Cabot Corporation under the trade name of Cab-O-Sil. Other compounding ingredients, known in the art, may also be incorporated.

Laminac is a registered trademark of the American Cyanamid Company. Laminac Polyester Resin EPX-126-3 is a flexible polyester resin containing styrene monomer. Laminac Polyester Resin 4128 and 4123 are two rigid polyesters. The flexible and rigid polyesters can be blended to modify their properties. Table I shows comparative physical constants of the 3 resins and of a 50/50 blend of EPX-126-3 with 4123. The measurements are made on ⅛" unfilled castings, cured with 0.5% benzoyl peroxide.

TABLE I

|  | EPX-126-3 | 4128 | 4123 | 50% 4123 and 50% EPX-126-3 |
| --- | --- | --- | --- | --- |
| Barcol Hardness | 0 | 55-60 | 55-60 | 45-50 |
| Tensile Strength, p.s.i., 77° F | 2,100 | 8,500-10,000 | 8,300 | 7,300 |
| Elongation at break, percent | 75 | 1.5-1.7 | 1.45 | 4.6 |
| Flexural Strength, p.s.i., 77° F |  | 17,000-20,000 | 18,500 | 13,000 |
| Flexural Modulus, p.s.i.×$10^6$, 77° F |  | 0.67-0.70 | 0.69 | 0.34 |
| Izod Impact, ft.-lb./inch, notched | 3.06 | Not taken | 0.25 | 0.33 |

The flexural strength and flexural modulus of Laminac Polyester Resin EPX-126-3 cannot be measured with the standard method. It bends too much.

Polyesters are classified as "rigid" or "flexible," etc. Since the degree of stiffness in bending (i.e. flexural modulus) is the characteristic most frequently associated with rigidity or flexibility, the following generalized classifications are suggested as a means of identification by Modern Plastics Encyclopedia, 1966 (published September 1965/vol. 43. No. 1A) on page 291:

|  | Modulus of elasticity in flexure, p.s.i. |
| --- | --- |
| Rigid polyesters | 5–6×$10^5$ |
| High impact or semi rigid | 3–5×$10^5$ |
| Semi-flexible polyesters | 1–3×$10^5$ |
| Flexible polyesters | <1×$10^5$ |

The modulus spectrum is continuous and the divisions in the above groups are arbitrary, but they are useful as a guide. The most rigid polyesters have tensile elongations at break of 1 to 2%; flexible unsaturated polyesters with as high an elongation as 200% can also be made. As flexibility increases while the styrene content is kept constant, the viscosity decreases, the hardness decreases, heat distortion temperature and heat resistance decrease, impact strength increases, flexural strength decreases and water and chemical resistance generally decrease. The opposite is true when the rigidity increases.

Examples marked P-E-#, illustrate polyester compositions suitable for various specific purposes of this invention. Example P–E–1 illustrates a composition suitable to make outer shell components. All percentages are by weight.

Example P–E–1.—Flexible polyester for shell component

A composition was prepared from Laminac Polyester Resin EPX–126–3 92.6%, MEK peroxide 2.7%, cobalt naphthenate solution (6% Co content) 0.27%, Laminac Additive #10 1.75% and Cab-O-Sil 2.7%, totaling 100%. MEK peroxide is methylethyl ketone peroxide. Laminac Additive #10 is a petroleum wax composition dispersed in styrene, for ease of incorporation into polyesters. It improves surface characteristics. The gel time of this composition at room temperature is about 10 minutes. The Cab-O-Sil assists in regulating the thickness of the deposit if slush casting is used for molding. Two or three coats can be slushed to obtain a desired shell thickness. The shell formation occurs at room temperature. To increase relative rigidity, more rigid polyesters can be blended with the flexible one used in this example. Latex molds and generally those utilized with epoxy resins may be used with polyesters.

Examples P–E–2 and P–E–3 illustrate compositions suitable to form the inner rigidifier component according to this invention.

Example P–E–2.—Rigid polyester for inner rigidifier component

A rigid polyester slush casting composition is prepared by mixing 41.34% of Laminac Polyester Resin 4128, 0.10% of Cobalt naphthenate (6% Co), 41.34% of 325 mesh silica (flint), 16.53% of 60 mesh silica (flint), and 0.69% MEK peroxide, totaling 100%. The ingredients are mixed in the order of listing. The setting time of this filled polyester composition can be varied by changing the proportions of the catalyst (MEK peroxide) and cobalt metal content. The polyester resin used in this example gels at room temperature in absence of fillers in time intervals ranging from about 10 minutes with 1% catalyst and 0.3% cobalt naphthenate (6% metal content), to about 180 minutes with 0.5% catalyst and absence of cobalt naphthenate. In these gelling tests the MEK peroxide is applied as catalyst in a 60% solution. The setting time of the filled composition of this example may be varied from about 4 minutes to about several hours at room temperature.

Example P–E–3.—Rigid polyester composition for inner rigidifier component, suitable with fiberglass reinforcement A composition suitable for use with fiberglass reinforcement has the following weight parts: Laminac Polyester Resin 4128 100 parts, cobalt naphthenate (6% metal content) 0.2 parts, 325 mesh silica 100 parts and MEK peroxide 1 part, totaling 201.2 parts. This composition sets in about one-half hour. By varying the quantities and proportions of the catalyst and accelerator the speed of setting can be changed and regulated. Increased ambient temperature accelerates setting time.

Examples P–E–4 and P–E–5 illustrate flexible polyester compositions suitable to produce ancillary reinforcing elements of this invention.

Example P–E–4.—Flexible polyester for ancillary reinforcing element 12.4% of Laminac Polyester Resin 4128, 37.2% of Laminac Polyester Resin EPX–126–3, 0.1% of cobalt naphthenate with 6% metal content, 49.3% of silica (flint) 325 mesh grade, and 1% of MEK peroxide are mixed, totaling 100%. In the resin content of this example there is 25% of Laminac Polyester Resin 4128 and 75% of Laminac Polyester Resin EPX–126–3. The composition of this example can be slush cast at room temperature and it sets in about 10 to 15 minutes. By reducing the quantity of cobalt and MEK peroxide the setting time can be extended.

Example P–E–5.—Flexible polyester for ancillary reinforcing elements

Example P–E–4 is repeated with the change that the resin component is entirely 49.6% of Laminac Polyester Resin EPX–126–3, the other ingredients remaining unchanged. This composition produces a more flexible resin layer than the preceding example and is preferred.

Epoxy resins are characterized by the presence of epoxy groupings. They are well known in the art. Reference is made to Modern Plastics Encyclopedia 1966, referred to above, pages 165 to 169. One of the commercially available types is made by condensation of bisphenol A with epichlorhydrin. Generally 2 mols of epichlorhydrin are reacted with 1 mol of bisphenol A. Polymerization may occur during the condensation reaction in varying degree. All of these resins have epoxide groupings in the two end positions in a linearly written formula. The polymerized center positions show ether linkages and hydroxyl groupings, both formed by the epoxy grouping of the epichlorhydrin. If we consider the number of the linkages converted to ether-hydroxyl grouping as $n$, one can visualize that $n$ can be equal to zero or more. The resins containing $n=0-1$ are liquid and are preferred for the purposes of this invention. The types where $n$ is higher than 1 become gradually more solid and brittle and are more suitable for esterification reactions, for instance, with fatty acids for coating material purposes. A few Epon resins are listed here for illustrative purposes. Epon is a registered trademark of Shell Chemical Company. Epon Resin 828 is designed in theory to give $n=0$, but in practice its $n$ content is between 0 and 1. Its epoxide equivalent is 185 to 192. Epon Resin 830 is similar to Epon Resin 828, but its $n$ is slightly nearer to 1 than with the 828 type. This indicates the presence of some higher homologues. Its epoxide equivalent is 190 to 210. Epon Resin 834 is formulated in theory to have $n=1$, but in practice its $n$ is between 1 and 2. This is also indicated by the epoxide equivalent of 230 to 280 for this resin. All 3 of these resins are liquid at room temperature.

Another type of epoxy resins is the group of low-viscosity, liquid, aliphatic polyepoxides. They are prepared by the oxidation of olefins with peracetic acid. Other examples of epoxy resins are cycloaliphatic epoxy resins and epoxidized fatty oils and fatty acid esters. Epon Resin 871 is an illustration of liquid aliphatic polyepoxides with an epoxide equivalent of 390 to 470. It is compatible with Epon Resin 828 in all proportions and is suitable to increase the flexibility of the latter. The list herein given is illustrative and does not limit the scope of suitable epoxy resins.

The selection of a curing agent or hardener for epoxy resins depends on the application. Factors considered in selection of the hardener include: (1) viscosity; (2) pot life; (3) curing cycle; (4) end-use property requirements; and (5) environmental conditions expected in the end-use. The curing agents fall into the broad categories of (a) amines, (b) acids and anhydrides and (c) catalysts and latent hardeners. Suitable curing agents include DTA (diethylenetriamine, also called DETA), AEP (N-aminoethylpiperazine), TETA (triethylenetetramine), NMA (NADIC Methyl Anhydride), AA (adipic anhydride), DDSA (dodecenylsuccinic anhydride). Catalysts include borontrifluoridemonoethylamine, dicyandiamide and benzyldimethylamine.

Flexibility and rigidity are regulated, for example, by the percentual proportion of bisphenol-A comprising rigid epoxy resins and of the flexible liquid aliphatic polyepoxide. Epoxidized fatty acid esters may also be used as flexibilizing additives.

Epoxy plasticizers include epoxy compounds of fatty oils and their acids. Epoxy novolac resins and cycloaliphatic epoxies are other illustrative members of the epoxy resin group. Polyamides and acid anhydrides may also be used as curing agents.

Example E–R–(i) illustrates an epoxy resin composition suitable for the outer shell component.

Example E-R-(i).—Epoxy Resin composition for outer shell component

The proper composition has at least 3 ingredients: (1) a low molecular weight epoxy resin of the epichlorhydrin-bisphenol A condensation product type; (2) a low viscosity liquid aliphatic polyepoxide imparting increased flexibility to the condensation product type; and (3) a curing agent, illustrated by diethylenetriamine and triethylenetetramine, respectively known as DTA and TETA. Other comparable items, known in the trade, may be replaced for the commercial products mentioned in this example. Fillers may be present as additional ingredients. A suitable additive to regulate viscosity is Cab-O-Sil, identified in detail further above. A satisfactory composition to obtain shells is 44.25% Epon Resin 828, 44.25% Epon Resin 871, 2.65% of Cab-O-Sil and 8.85% of diethylenetriamine, totaling 100%. This composition sets at room temperature in about 5 hours and at 80° C. it sets in 2 hours. The composition may be varied according to principles known in the art. Shells can be prepared in latex molds or in other elastomer molds. These are actually multi-pieced plaster of paris molds externally reinforcing an entirely separate second slit flexible elastomer mold, having one opening for pouring in the composition to be molded and set. The rubber surface is coated with a parting agent and the epoxy composition is slush cast into the molds. The slit mold here described is used to mold shells showing undercuts. Other molds and molding methods, known in the art, can also be used, depending on the article to be manufactured.

Example E-R-(ii) illustrates an epoxy composition suitable to form the inner rigidifier component.

Example E-R-(ii).—Epoxy resin composition for inner rigidifier component

A suitable composition has the following weight parts: Epon Resin 828 100 parts, Epoxide #7 (Procter & Gamble) 5 parts, 325 mesh silica 100 parts, 60 mesh silica 100 parts, diethylenetriamine 10 parts, totaling 315 parts. A small quantity of Cab-O-Sil can be added to regulate viscosity and drainage time. This additive increases viscosity and decreases drainage time on vertical surfaces. The composition of this example is suitable for fiberglass reinforced applications.

It should be noted that flexible epoxy resin compositions are preferred to the polyester compositions for the use of ancillary reinforcing elements according to this invention. The epoxy compositions can be applied by slush casting and they set overnight at room temperature to a sufficient degree so that the articles can be handled. Complete polymerization is achieved in an additional few days time. The epoxy layers are very tough. Example E-R-(iii) illustrates a suitable composition for ancillary reinforcing elements comprising epoxy resins.

Example E-R-(iii).—Epoxy Resin composition for ancillary reinforcing elements

A flexible epoxy resin composition is prepared of the following ingredients: 15.05% Epon Resin 871, 15.05% Epon Resin 828, 6.15% Epoxide #7 (an epoxy plasticizer of Procter & Gamble), 30.20% of 325 mesh grade silica, 30.20% of 60 mesh grade silica, 3.00% of diethylenetriamine (DTA) and 0.35% of Cab-O-Sil, totaling 100%. The nature of some of the ingredients are described further above in this specification. The Cab-O-Sil regulates viscosity, flow and stoppage of flow.

A few more data can be mentioned to assist in formulating rigid or flexible epoxy resin compositions. Blends of Epon Resin 871 and Epon Resin 828 cure at room temperature with certain polyamines, such as with DTA and AEP. They require elevated temperatures for curing with other curing agents. A limit of 10% elongation at break is a reasonable top limit to characterize rigid epoxy resins. Using elevated curing temperatures to secure curing with diversified curing agents, the following facts can be cited: (1) 60% 871 and 40% 828 resin blend, using a curing schedule of 4 hours at 125° C. yields with 7.4 PHR (parts per hundred resin) of diethylenetriamine 4240 p.s.i. tensile strength at break and 6% elongation; a 40%:60% blend of the same resins, with the same curing agent at 8.4 PHR yields 5680 p.s.i. tensile strength at break and 2% elongation. (2) A 40% 871 and 60% 828 resin blend at a cure of 4 hours at 125° C., using 18 PHR N-aminoethylpiperazine yields 8840 p.s.i. tensile strength at break and 9% elongation. (3) A 60% 871 and 40% 828 resin blend, using a cure schedule for 2 hours at 80° C.+3 hours at 150° C. and 14.5 PHR Epon Curing Agent Z (a proprietary aromatic amine), yields 6770 p.s.i. tensile strength at break and 13% elongation; whereas a 40% 871 and 60% 828 blend, using the same curing schedule and 16.3 PHR of the same curing agent, yields 9540 p.s.i. tensile strength at break and 5% elongation. (4) In a standard blend of the two resins using AEP as curing agent the room temperature cure took 7 days at 25° C. and 4 hours at 125° C., yielding comparable tensile strength at break of 3760 and 3600 respectively. The blend used was 67% 871 and 33% 828.

Epon Resin 828 yields, with numerous other types of flexibilizers, rigid epoxy resin compositions. Examples are (a) long-chain reactive polysulfides (Thiokol liquid polymers), (b) amine-terminated polyamides (Versamid resins), (c) epoxy terminated natural oils (Cardolite) and (d) certain fatty acids (Emery Polymerized Fatty Acid 3162 of Emery Industries, Inc.). The Thiokols are marketed by Thiokol Corporation, the Versamid resins by General Mills Corporation, the Cardolites by Irvington Varnish Division, Minnesota Mining & Manufacturing Company. They yield in mixtures ranging from 70 to 90% Epon Resin 828 and flexibilizer ranging from 30 to 10%, using Epon Curing Agent Z, cured 1 hour at 90° C.+2 hours at 177° C. tensile strength values at break of from about 9,000 p.s.i. to about 12,500 p.s.i. and elongations ranging from about 3.0% to about 5.5%. These data are given for illustrative purposes only. Room temperature cures are preferred in the instant invention. Excessive curing temperatures may cause distortion of many of the outer shell components, whether a reinforcing second mold is used or not during the formation of the inner rigidifier component.

THE INNER RIGIDIFIER COMPONENT AND METHODS OF ITS APPLICATION

The inner rigidifier components of the composite articles of manufacture of this invention are resinous compositions comprising a member of the class consisting of rigid polyesters and rigid epoxy resins. Rigid polyester resins and rigid epoxy resins have been described in an earlier section of this specification. Examples P-E-2 and P-E-3 illustrate suitable polyester compositions. Example E-R-(ii) illustrates a suitable epoxy resin composition. The rigid polyesters are preferred over the rigid epoxy resins as the resin component of the inner rigidifier. Polyesters cure at faster rates then epoxy resins and therefore permit faster production schedules. The inner rigidifier component may advantageously be reinforced by fibrous materials. Fiberglass illustrates such fibrous materials.

The application of glass fiber reinforcement requires large access openings in the outer shell component to accommodate the tools necessary for application. For this reason it is not practical for smaller objects or for composite articles of manufacture which necessarily carry small access openings.

Fiberglass reinforcements are supplied as continuous strands, fabrics, mats, chopped strands, and other forms. Other useful fibrous reinforcements may include sisal, cotton, jute, asbestos, synthetic fibers, and metallic fibers, amongst others.

The resinous composition forming the inner rigidifier component may be applied by various suitable methods. The application is from a liquid state. Casting is a suitable method, such as slush casting, or rotational casting, or centrifugal casting, or brushing, or spraying, amongst others. The viscosity of the liquid composition is adjusted by formulation to supply the required degree of flow and drainage properties desirable for the particular application method selected.

Fiberglass is a suitable illustration for fibrous reinforcement. It can be applied by a number of processes. Suitable application methods are, for instance, the ones known as hand lay-up method, spray-up method and centrifugal casting method. For each particular method the glass fibers are selected in a proper form. For instance, continuous roving can be used with spray-up and centrifugal casting, and mats, fabrics, woven rovings can be used for hand lay-up. In one application method chopped strands and the polyester composition are sprayed simultaneously from a special gun, depositing both the fiberglass and the polyester resin composition in proper proportion on the interior surface of the outer shell component. In another application method the chopped strands are pre-impregnated with the resinous composition and jointly applied. This requires a dispersion of the chopped strands in the resinous composition. In the hand lay-up method the polyester composition is applied first by brushing or spraying and the fiberglass can then be applied as a mat by hand and rolled over by a special roller to remove air pockets. This is followed by another coat of the polyester composition. In still another method the chopped strands are distributed by a suitable method over the surface of the freshly applied resinous composition, for instance, by the aid of a blow gun and this step is followed by an additional application of the polyester composition.

What is stated above for rigid polyester compositions applies also for rigid epoxy resin compositions. The former are preferred because of their faster setting and curing time, particularly where fibrous reinforcement is also utilized. Combinations and modifications of the above outlined illustrative methods are used where special circumstances require such changes.

Whereas unfilled rigid polyester and epoxy resins can be used to form the inner regidifier component according to this invention, filled compositions are preferred. The fillers reduce shrinkage during curing and have other additional advantages. Silica (flint) illustrates a suitable filler. 325 and 60 mesh qualities are presented in the illustrative examples. When 60 mesh silica is used, the composition may require the use of a special type of spray gun, on account of the large particle size of some of the filler particles.

The rigid polyesters, particularly, and to a lesser extent the rigid epoxy resins of the inner rigidifier component, may show limited adhesion to some of the outer shell components. In an embodiment of the invention, therefore, an adhesive is applied as an intermediary layer between the shell component and the inner rigidifier component. Suitable adhesives will be discussed further below.

The rigid polyester and rigid epoxy resin inner regidifier components, per se, are somewhat brittle. They are well protected on one side by the pliable outer shell components. Their toughness is improved by fibrous reinforcement. In most cases, particularly where fibrous reinforcement is absent, however, it is advantageous to provide for an ancillary reinforcing element, such as an adhering layer of a flexible epoxy resin composition, or of a flexible polyester composition. The ancillary reinforcing elements will be discussed further below.

At this point a clarifying statement may be made. In the manufacturing of fiberglass reinforced polyester products it is customary to first prepare a gel coat and follow it with applying thereto a fiberglass reinforcing element, such as matting, roving or chopped strands. Chair seats, boats or boat components are made by such methods. The gel coat is a polyester and is applied in most cases in thicknesses of 7 to 15 mils. However, with some difficulties thicknesses up to 30 mils may also be produced. Products made of the combination of such gel coats and fiberglass reinforcement differ from the composite articles of manufacture herein claimed by the absence of the premolded hollow pliable shell component, amongst other factors.

IMPROVING ADHESION BETWEEN THE SHELL AND RIGIDIFIER COMPONENTS

In many instances it is advantageous to apply an adhesive as an intermediate layer between the outer shell component and the inner rigidifier component. This is particularly true when the outer shell component is derived from plastisol and the inner rigidifier component comprises a rigid polyester resin.

Neoprene cement illustrates a suitable adhesive. Columbia Cement Company's Neoprene Cement #742 illustrates this group. I have applied it in a diluted solution form, using 20% of Cement #742 and 80% methylethyl ketone, proportions by weight. This solution was applied by slush casting to the interior surface of a premolded plastisol shell through its access opening and air dried. This was followed by the application of the resinous composition of Example P-E-2, using slush casting as application method.

For individual purposes suitable adhesives may be selected from the group of hot asphalt adhesives, resorcinol adhesives, rubber emulsions, rubber solutions (cements), epoxy resins, special polyester resins, latex, latex modified cements, amongst others.

Other adhesives suitable for individual purposes are: (1) Solutions of Vinylite Resin VAGH in solvents, as in methylethyl ketone, or in mixtures of toluene and methylethyl ketone. This is a copolymer of vinyl acetate, vinyl chloride and vinyl alcohol, and is compatible with alkyd resins and polyesters. (2) Polyurethane adhesives of the 2 part and 1 part systems. (3) An adhesive containing vinyl resins, methylethyl ketone, dioctyl phthalate and methylene-bis(4-phenyl isocyanate). (4) Nitrile rubber adhesives. (5) Nitrile-phenolic adhesives as discussed on Page 490, Col. 2, Par. 6 of Handbook of Adhesives, by Irving Skeist, Reinhold Publishing Corp., 1962/64. See also pages 236 to 241 of same publication.

According to one embodiment of this invention, improved adhesion can be achieved by the application of a joint "contact resin" ingredient being simultaneously present in the outer shell component and the inner rigidifier component. This contact resin is compatible with the composition of both components and its simultaneous presence promotes the adhesion of the two components, thereby eliminating the need for a special adhesive layer placed between them. A peracetic epoxy resin is a suitable illustration. Bakelite Epoxy Resin ERL-4289 is bis(4,4-epoxy-6-methylcyclohexylmethyl) adipate. In one step 20 p.h.r. (parts per hundred resin) of this peracetic epoxy resin is incorporated into the plastisol composition and boron-trifluoride monoethylamine is added thereto in a proportion of 2% additive based on the weight of the epoxy resin. This plastisol compound is then molded at about 275° F. for a time sufficient to gel, but not to fuse the plastisol. The mold is opened and the rigid polyester forming composition is applied. The polyester composition contains about 10% of the peracetic epoxy resin ERL-4289 based on the weight of the polyester resin. The curing is then continued to complete the fusion of the plastisol component and the setting and polymerization of the rigid polyester containing inner rigidifier component. This process results in a satisfactory adhesion between the two components, however, it is not suitable for shells which have undercuts that make removal from the mold difficult after rigidification.

ANCILLARY REINFORCING ELEMENTS

The outer shell component and the inner rigidifier component jointly form a cavity, according to this invention. When the composite article of manufacture is exposed to strong stresses and pressures the application of an ancillary reinforcing element may be useful and desirable. Such an ancillary reinforcing element assists the rigidfying action of the inner rigidifying component, toughens the composite article of manufacture and it increases the impact resistance of the latter. In some of my prior patent applications this element was called a reinforcing spine. This ancillary reinforcing element may be of metal, paper chipboard, cardboard, or of a synthetic resin layer, amongst other suitable materials. The element may be continuous or discontinuous. When it is continuous, it may be applied by casting, such as slush casting or rotational casting. Low melting point metal alloys, used as ancillary reinforcing elements, may be applied by casting. The same applies to the suitable synthetic resin compositions, illustrated by flexible polyester resins and by essentially flexible epoxy resins. In many instances, metals with a melting point of 700° F. may be successfully cast into cavities formed jointly by the outer shell and inner rigidifier components. This can be explained by the cooling action of the system forming the joint cavity on the required cast thin metal layer. Rigid plastics foams may also be utilized as ancillary reinforcing elements. Rigid polyurethane foams may be foamed-in-place in the joint cavity of the two components. The foam can form either a layer on the interior surface or fully fill out the joint cavity of the two components.

The favored ancillary reinforcing elements of this invention are the flexible epoxy resins and flexible polyester resin. The flexible epoxy resins are preferred for this purpose. Suitable compositions are illustrated by Examples P–E–4, P–E–5 and E–R–(iii). They are described further above. The flexible epoxy and polyester resins coat the entire interior surface of the joint cavity and are advantageously applied by casting. They improve to a great extent the resistance of the composite articles of manufacture to the following stresses: impact, flexing, compression and tension.

The preferred flexible epoxy resin compositions can be applied by slush casting and they set overnight at room temperature to a sufficient degree so that the articles can be handled. Complete polymerization is achieved in an additional few days. The epoxy layers are very tough.

An illustration of desirable thickness for the resinous ancillary reinforcing elements is from about 15½ mils to about 250 mils. Many of the resinous compositions can be applied by spraying. Useful proportions between the thicknesses of the resinous rigidfier component and of the resinous ancillary reinforcing element are between a proportion of 1:1 and a proportion of 1:3. These proportions and thickness ranges are illustrative and are not given to limit the scope of the claimed invention.

In Example E–R–(iii) an epoxy resin composition is described suitable for ancillary reinforcing element. In this example EPON Resin 871 is one of the components. This resin comprises unsubstituted 2,3-epoxyalkyl esters of mixtures of dimer and trimer fatty acids having 12–30 carbon atoms.

AN ILLUSTRATIVE EXAMPLE OF MANUFACTURING PROCESS STEPS

This example is given for illustration of a satisfactory sequence of process steps and is not intended to limit the scope of the invention herein claimed.

Step 1.—A hollow outer shell component is prepared in a seamless die by casting from a plastisol composition. Preparation is either by sush casting or by rotational casting.

Step 2.—Heating the plastisol containing die to cause gelation in a manner to produce, after fusion, a plastisol wall thickness of from about 15½ to about 250 mils. If there is any ungelled liquid excess plastisol in the die, it is removed by pouring off.

Step 3.— Heating the die to cause fusion of the gelled plastisol within the die.

Step 4.—Stripping the shell component from the die. This is done preferably at suitable elevated temperatures falling between room temperature and 200° F.; but, it could be done at room temperature also. The shell component is then brought to room temperature.

Step 5.—A neoprene cement adhesive is applied to the interior surface of the plastisol shell. The cement is diluted by a suitable solvent, such as methylethyl kentone and applied by slush casting. Spraying may replace slush casting. The adhesive is air dried at room temperature.

Step 6.—The rigid polyester composition of Example P–E–3 is prepared in a separate step.

Step 7.—The rigid polyester composition of Step 6 is applied by slush casting to the neoprene cement coated interior surface of the plastisol shell component. Slush casting is repeated if the first casting did not yield the desired rigidifier thickness.

Step 8.—The polyester rigidifier composition is allowed to set.

Step 9.—In a separate step the ancillary reinforcing element composition of Example E–R–(iii) is prepared, comprising a flexible epoxy resin.

Step 10.—Before the rigid polyester composition applied in Step 7 is fully hardened, but after it has set, the epoxy resin containing composition prepared in Step 9 is applied by slush casting to the entire inner surface of the rigid polyester.

Step 11.—The composite article of manufacture is allowed to be stored at room temperature to cause setting and hardening of the polyester rigidifier component and of the flexible epoxy resin containing ancillary reinforcing element.

In an alternative of the above eleven step process, Step 7 is modified. In this alternative the rigid polyester composition is reinforced by fiberglass. The rigid polyester composition of Step 6 is applied by a special spray gun to the neoprene cement coated interior surface of the plastisol shell component. The special spray gun chops fiberglass rovings to the required size and blows the chopped rovings simultaneously with the atomized rigid polyester composition of Step 6, providing mixing of the rovings and the binder resin on the way to the shell to be coated. The fiberglass reinforced rigid polyester coating is treated then to eliminate any air pockets by, for instance, rolling or stamping down the surface. This process step is repeated until the desired rigidifier thickness is achieved that develops the required rigidification of the end product. It is preferable to use sized fiberglass rovings in this process. Sizing is an aftertreatment of the glass fiber surface in order to improve its wetting-out and/or processing characteristics. Treatment with chromium compounds and with silanes (silicones) illustrates popular aftertreatment methods.

In the here above described alterantive to Step 7, Steps 9 and 10 may further be varied. In one variation Steps 9 and 10 are omitted, and Step 8 is followed directly by Step 11. As a consequence of the reinforcing action of the fiberglass, the omission of Steps 9 and 10 is possible In another variation Steps 9 and 10 are replaced by Steps 9–A and 10–A, respectively. In Step 9–A a rigid polyurethane foam composition is prepared in liquid form, suitable for foam-in-place application. This is then followed by Step 10–A, consisting of pouring the composition of Step 9–A into the joint cavity formed by the shell component and the fiberglass reinforced polyester rigidifier component, causing the composition to foam-in-place, and to set to the thermoset stage. This is then followed by Step 11 which is unchanged for all the alternatives and variations, except that where the flexible epoxy resin containing ancillary reinforcing element is omitted, its hardening is also eliminated.

In the drawings:

FIG. 4 illustrates a composite article of manufacture of this invention. 12 is the outer shell component and 13 is the inner rigidifier component comprising the rigid polyester of rigid epoxy resin. The inner rigidifier component may be reinforced by fibrous materials, such as fiberglass.

FIG. 8 illustrates the vertical view of the rear of a refrigerator door. 12 is the outer shell component. 17 is the inner rigidifier component, which is a fiberglass reinforced rigid polyester resin. 14 indicates an adhesive layer. 18 is rigid polyurethane foam, applied as an ancillary reinforcing element. "9" indicates the point of section of FIG. 8 illustrated by FIG. 9.

FIG. 10 is a front view of the refrigerator door illustrated by FIGS. 8 and 9. The numbered items have the same meaning as in FIGS. 8 and 9. The outer shell component is made advantageously of plastisol and the textured decorative effects 16 are molded into the outer shell component.

Figure 1:
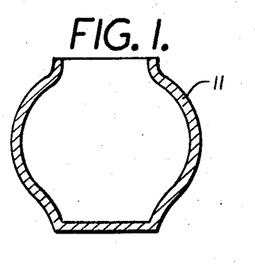
FIG. 1 is a vertical cross-sectional view of a single piece mold utilized in the present invention to prepare the shell portion. 11 is the metal mold and it shows an undercut.
Figure 2:
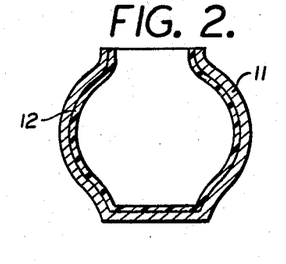
FIG. 2 is a vertical cross-sectional view of the mold of FIG. 1. Shell 12 is molded in mold 11.
Figure 3:
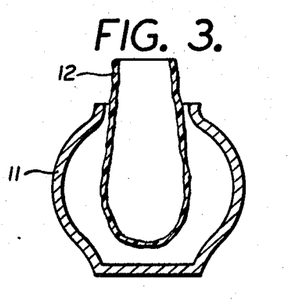
FIG. 3 is a vertical cross-sectional view of the mold 11 of FIG. 1, illustrating the removal of the plastisol shell 12 from the mold. The shell is in a somewhat collapsed and distorted state at the removal temperature, but regains its original molded shape after removal and cooling to room temperature.
Figure 4:
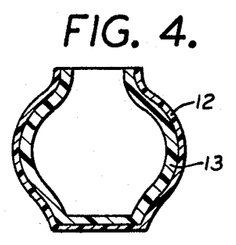
Figure 5:
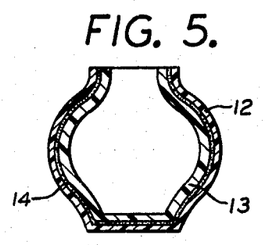
FIG. 5 illustrates the application of an adhesive layer 14 between the interior surface of the outer shell component 12 and the inner rigidifier component 13. Neoprene illustrates a satisfactory adhesive.
Figure 6:
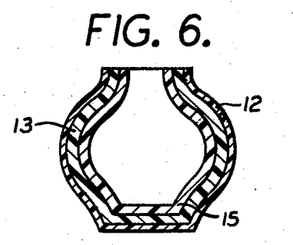
In FIG. 6 the shell component is 12, the inner rigidifier component is 13 and 15 illustrates an ancillary reinforcing element applied to the entire interior surface of the cavity formed jointly by 12 and 13. The ancillary reinforcing element is advantageously a resinous composition comprising a flexible epoxy resin or a flexible polyester resin as the major component.
Figure 7:
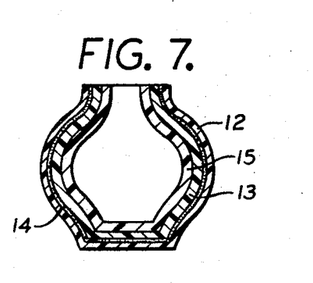
FIG. 7 is a combination of FIG. 5 and FIG. 6 and it shows the simultaneous use of an adhesive layer 14 and an ancillary reinforcing element 15.
Figure 8:
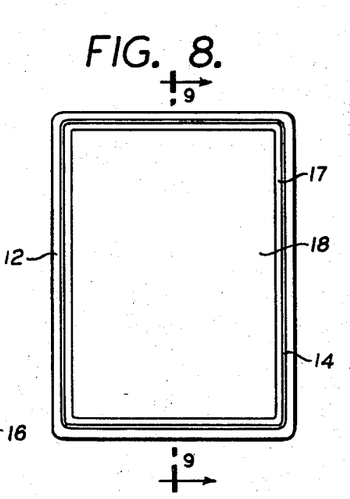
Figure 9:
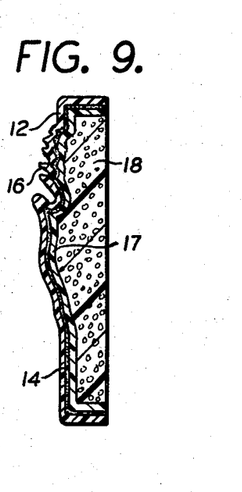
FIG. 9 is the vertical cross section of the refrigerator door of FIG. 8 at the position indicated therein by "9". 12, 14, 17 and 18 have the same meaning as in FIG. 8. 16 illustrates textured decorative effects applied to the surface of the front of the door. The texture gives a discontinuous decorative pattern which may be raised or incised or in part raised and in part incised.
Figure 10:
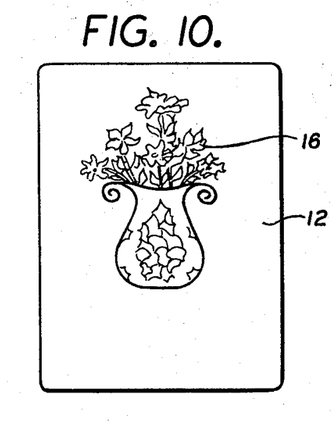

I claim:

1. A rigid decorative hollow article comprising an outer shell component and an inner rigidifier component, said outer shell component being a premolded pliable thermoplastic material having an access opening and which, when free of the rigidifier component, is at least temporarily deformable by hand pressure, the inner rigidifier component being a rigid thermosetting plastic in intimate contact with the entire inner surface of said outer shell component and jointly forming an internal cavity therewith, wherein said inner rigidifier component includes a member of the class consisting of rigid polyester resins and rigid epoxy resins, and wherein said polyester resins include the condensation product of a dibasic acid and a diol and also include a cross-linking monomer reactant.

2. The rigid decorative hollow article of claim 1, wherein the rigidifier component comprises a polyester resin.

3. The rigid decorative hollow article of claim 1, wherein the rigid resin of the rigidifier component is a fiberglass reinforced resin.

4. The rigid decorative hollow article of claim 1, wherein a layer of adhesive is present between the outer shell component and the rigidifier component, said adhesive promoting the adhesion between the two components.

5. The rigid decorative hollow article of claim 1, wherein a layer of neoprene adhesive is present between the outer shell component and the rigidifier component, said neoprene adhesive promoting the adhesion between the two components.

6. The rigid decorative hollow article of claim 1, including an additional layer of a thermosetting flexible resin intimately bonded to the entire inner surface of the inner rigidifier component, which resin comprises a member of the class consisting of flexible thermosetting polyester resin and flexible thermosetting epoxy resins and wherein said additional layer acts as an ancillary reinforcing element for the article.

7. The rigid decorative hollow article of claim 1, including as an additional component, an ancillary reinforcing supporting element intimately bonded to the entire inner surface of the cavity jointly formed by the outer shell and the inner rigidifier components.

8. The rigid decorative hollow article of claim 1, wherein in parallel horizontal cross-sections show variations in shape, indicating undercuts and curved surfaces.

9. The rigid decorative hollow article of claim 1, wherein the outer shell component has a wall thickness of from about 15½ to about 250 mils.

10. The rigid decorative hollow article of claim 1, wherein the outer shell component comprises a plasticized polyvinyl chloride.

11. The rigid decorative hollow article of claim 1, wherein the outer shell component comprises a copolymer of vinyl chloride in a plasticized state.

12. The rigid decorative hollow article of claim 1, wherein the outer shell component comprises ethylene in a polymerized state.

13. A rigid decorative hollow article comprising a hollow outer shell component (a), an inner rigidifier component (b), an adhesive layer (c) placed between said outer shell component (a) and inner rigidifier component (b) and an additional component layer (d), said outer shell component (a) being a premolded pliable thermoplastic material having an access opening and being itself at least temporarily deformable by hand pressure, said thermoplastic material comprising vinyl chloride in a polymerized and plasticized state, said inner rigidifier component (b) comprising a rigid polyester resin in a polymerized thermoset state in intimate contact with the entire inner surface of said outer shell component and jointly forming an internal cavity therewith, said rigid polyester resin comprising the condensation product of a dibasic acid and a diol and also comprising a cross-linking monomer reactant, said adhesive layer (c) being a layer of a neoprene adhesive, and said additional component layer (d) comprising a flexible epoxy resin in a cured thermoset state which is positioned within the cavity jointly formed by the outer shell component and the inner rigidifier component and wherein said additional component layer (d) is in intimate contact with the entire inner surface of said rigidifier component.

14. A rigid decorative hollow article comprising an outer shell component and an inner rigidifier component, said outer shell component being a premolded pliable plastic material having an access opening and a wall thickness of from about 15½ mils to about 250 mils and which, when free of the rigidifier component, is itself temporarily deformable by hand pressure, the inner rigidifier component, formed within the cavity of the hollow outer shell component, being a rigid thermosetting plastic in intimate contact with the entire inner surface of said outer shell component and jointly forming an internal cavity therewith, wherein said inner rigidifier component includes a member of the class consisting of rigid polyester resins and rigid epoxy resins, and wherein said rigid polyester resins include the condensation product of a dibasic acid and a diol and also include a cross-linking monomer reactant.

15. The process of producing rigid decorative hollow articles comprising a hollow outer shell component which has an access opening and an inner rigidifier component, said process comprising the steps of (a) casting a plastisol in a seamless mold, (b) heating the plastisol to gelation temperature, (c) fusing the gelled plastisol layer to form a tough premolded shell component having a wall thickness of at least 15½ mils and not substantially more than 250 mils, (d) stripping the premolded shell component from the mold, (e) preparing, in a separate step, a plastic composition suitable to form a rigid inner rigidifier component in the premolded shell component, wherein said plastic composition comprises a rigid polymerizable resin that is a member of the class consisting of rigid polyester resins and rigid epoxy resins, (f) applying said suitable plastic composition comprising said rigid polymerizable resin to the cavity of the premolded shell component through its access opening, (g) distributing the said plastic composition evenly upon the entire inner surface of the cavity of the outer shell component, (h) solidifying the said plastic composition inside the cavity of the shell component while forming therewith a joint internal cavity, and (i) recovering the rigid decorative hollow article so produced.

16. The process of producing rigid decorative hollow articles according to claim 15, wherein an adhesive is applied to the inner surface of the outer shell component before the application of the rigidifiable composition referred to in step (f).

17. The process of producing rigid decorative hollow articles according to claim 15, wherein a neoprene adhesive is applied to the inner surface of the outer shell component before applying the rigidifiable composition referred to in step (f).

18. The process of producing rigid decorative hollow articles according to claim 15, which includes the additional step after step (h) and prior to step (i) of coating the interior surface of the internal cavity jointly formed by the outer shell component and inner rigidifier component with a flexible thermosetting resin in bonding relation to the said interior surface, wherein said flexible thermosetting resin is a member of the class consisting of flexible thermosetting epoxy and polyester resins, and curing said resin in a further step.

19. The process of producing rigid decorative hollow articles according to claim 15, wherein the resinous composition forming the rigidifier component is applied by casting.

20. The process of producing rigid decorative hollow articles according to claim 15, wherein the resinous composition forming the rigidifier component is applied by slush casting.

21. The process of producing rigid decorative hollow articles according to claim 15, wherein the resinous composition forming the rigidifier component is applied by rotational casting.

22. The process of producing rigid decorative hollow articles according to claim 15, wherein the resinous composition forming the rigidifier component is applied by coating.

23. The process of producing rigid decorative hollow articles according to claim 15, wherein the resinous composition forming the rigidifier component is applied by spraying.

24. The process of producing rigid decorative hollow articles according to claim 15, wherein the resinous composition forming the rigidifier component is applied by brushing.

25. The process of rigid decorative hollow articles according to claim 15, wherein the resinous composition forming the rigidifier component is reinforced with fiberglass.

References Cited

UNITED STATES PATENTS

| 2,277,752 | 3/1942 | Frey | 161—6 |
| 2,794,756 | 6/1957 | Leverenz. | |
| 3,071,817 | 1/1963 | LaPorte | 264—302 |

FOREIGN PATENTS 670,275  4/1952  Great Britain.

ROBERT F. BURNETTE, *Primary Examiner.*

W. POWELL, *Assistant Examiner.*

U.S. Cl. X.R.

156—245, 326; 161—12, 43, 125, 160, 183, 184, 190, 213, 231, 413; 264—45, 250, 255, 267, 302, 310